Oct. 16, 1962 E. FRISCH 3,058,900
TRANSFER MECHANISM FOR NUCLEAR REACTORS
Filed Sept. 21, 1956 3 Sheets-Sheet 2

WITNESSES
Edwin E. Bassler
Donald J. Smith

INVENTOR
Erling Frisch
BY Arthur T. Stratton
ATTORNEY

Oct. 16, 1962 E. FRISCH 3,058,900
TRANSFER MECHANISM FOR NUCLEAR REACTORS
Filed Sept. 21, 1956 3 Sheets-Sheet 3

United States Patent Office 3,058,900
Patented Oct. 16, 1962

3,058,900
TRANSFER MECHANISM FOR NUCLEAR REACTORS
Erling Frisch, Pittsburgh, Pa., assignor to Westinghouse Electric Corporation, East Pittsburgh, Pa., a corporation of Pennsylvania
Filed Sept. 21, 1956, Ser. No. 611,303
17 Claims. (Cl. 204—193.2)

The present invention relates to a transfer mechanism and more particularly to such a mechanism adapted for use in association with nuclear reactors.

The transfer mechanism forming a subject of the present invention is intended in particular for use in exchanging the fuel elements and the like of nuclear reactors, such as that described in applicant's copending application, entitled "Nuclear Reactor," Serial No. 610,821, filed September 19, 1956, now abandoned, continued as application Serial No. 85,877, filed January 30, 1961, and assigned to the assignee of the present application. In order to obtain the maximum efficiency from such a reactor whether used for testing or for power purposes, it is important to minimize the shutdown time required for adding, withdrawing, or rearranging the fuel elements of the reactor. Moreover, it is essential to provide an efficient arrangement for handling the fuel elements in a manner that will not interfere with other essential activities being carried on in the vicinity of the reactor during the shutdown period. For the purposes of loading and unloading fuel elements and other materials relative to the nuclear reactor, such reactors are often provided with a canal or other waterway passing beneath the reactor, from which fuel elements and the like are loaded into an appropriate transfer mechanism for transporting them to the canal. It is, therefore, necessary to provide a transfer mechanism which can be easily loaded and unloaded under water while at the same time minimizing leakage of fluid from the reactor vessel into the canal, both during the operation of the reactor and during the actual use of the transfer mechanism. In order to further minimize shutdown time of the reactor and to maintain the biological shielding effect of the water contained in the canal, it is very desirable to disassemble the transfer mechanism without draining and, consequently, interferring with other work involving radioactive substances being carried on in the canal.

Heretofore those transfer mechanisms, provided for fuel elements and the like, frequently were furnished in the form of vertical tubes having associated therewith a series of tandemly connected gate valves. Such an arrangement not only was difficult to maintain and to repair but additionally required cyclic opening and closing of the valves, as the fuel elements were moved largely by hand through the transfer tube with the aid of complicated and cumbersome hand tools. The operation thus was a time consuming one, and the complexity of the arrangement rendered the same difficult to maintain in an effective operating condition.

Accordingly, an object of the invention is to furnish a more efficient means for handling the fuel elements of an atomic reactor.

Another object of the invention is to facilitate maintenance and repair of a transfer mechanism adapted for nuclear fuel elements and the like.

A further object of the invention is to adapt a transfer mechanism of the character described for operation under water or other liquid.

Still another object of the invention is to facilitate and to maintain the alignment of operating parts of the transfer mechanism.

Still another object of the invention is to facilitate the maintenance and more specifically the assembly and disassembly of a transfer mechanism associated with a nuclear reactor.

A still further object of the invention is to provide a transfer mechanism adapted for use with a pressurized nuclear reactor.

Yet another object of the invention is to provide a transfer mechanism wherein pressurized water or other suitable liquid is utilized to propel a carrier member through the mechanism.

These and other objects, features and advantages of the invention will be made more apparent during the ensuing description of illustrative forms of the invention, the description being taken in conjunction with the accompanying drawings wherein.

Figure 1:
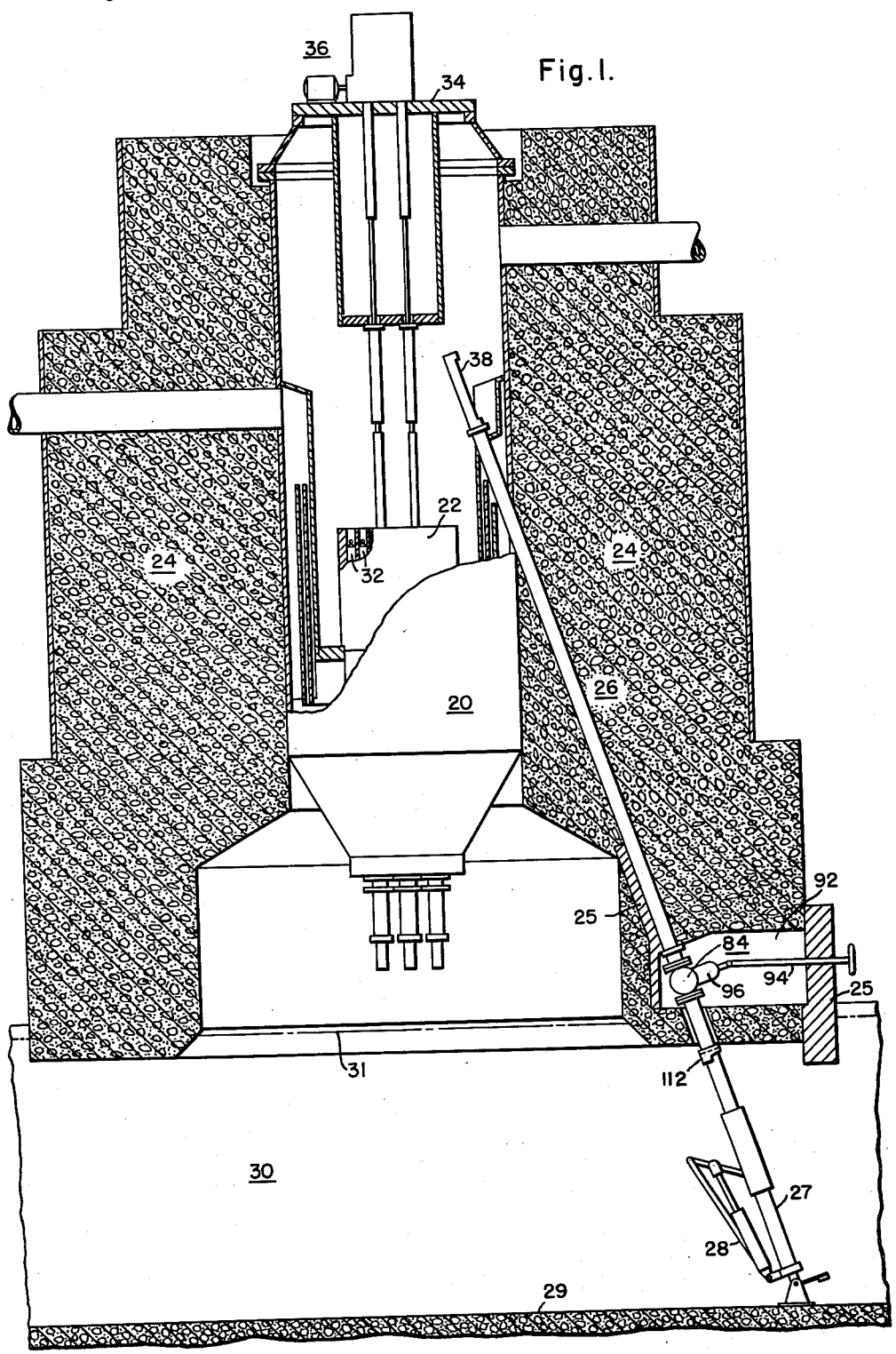
FIGURE 1 is a sectional view of a nuclear reactor having associated therewith one form of transfer mechanism arranged according to the principles of this invention.

In accordance with the invention there is provided an inclined tubular transfer mechanism through which a suitable carrier, adapted to receive an atomic fuel element or the like, can be conveyed by the action of gravity or pressurized water or other liquid in one direction and through the use of pressurized liquid in the other direction. An end of the tubular transfer arrangement is inserted through the reactor vessel wall, while the other end of the mechanism is disposed within a canal or other suitable unloading area provided outside of the reactor. In the case of pressurized reactors, suitable means are provided for preventing leakage of fluid from the transfer mechanism during the period in which the reactor is in operation. During shutdown of the reactor, when the transfer mechanism is being utilized for loading and unloading fuel elements relative to the reactor core, a novel valve arrangement is provided for minimizing the escape of fluid from the interior of the reactor vessel. The transfer mechanism is adapted for operation either by hand or by remote control from points without the biological shielding material surrounding the reactor. The operating parts of the transfer mechanism are arranged to be quickly and easily disassembled for maintenance or repair without necessitating shutting down the reactor or draining the canal normally provided for such reactors.

Referring now more particularly to the drawings the illustrative form of the invention depicted therein is adapted for use with an atomic reactor comprising a reactor vessel 20 having supported therein a reactor core 22. The reactor vessel 20 is supported and surrounded by a suitable shielding material 24 including, for example, concrete impregnated with magnetite or similar densifying material. A transfer mechanism indicated generally by the reference character 26 extends, adjacent the upward end thereof, through a wall of the reactor vessel 20 and is hermetically sealed thereto in a manner presently to be described. Those portions of the transfer mechanism 26 lying in proximity to operating areas adjacent the reactor are provided with additional shield material 25, preferably composed of lead. From the reactor vessel, the transfer mechanism 26 extends downwardly through the concrete shielding 24, desirably at an angle to the vertical axis of the reactor vessel 20 and terminates in a removable section 27 and associated suitable valve operating mechanism 28 secured to a bottom wall 29 of canal 30. For efficacious shielding of the reactor vessel 20 the shielding material 24 desirably is extended a short distance below water level 31 in the canal 30.

Suspended within the reactor core 22 are a plurality of fuel elements 32. Upon removal of top closure 34 of the reactor vessel 20 and the associated control rod drive mechanism indicated generally at 36, as described in applicant's aforesaid copending application, the fuel elements 32 can be removed by a suitable tool (not shown) inserted through the top of the reactor vessel 20 and caused to engage the fuel elements 32 in a manner disclosed in applicant's aforementioned copending application. Upon withdrawal of one of the fuel elements 32, the same can be raised by the aforesaid tool or by suitable remote handling mechanisms by an operator standing adjacent the top of the vessel 20 but outside thereof.

Figure 2:
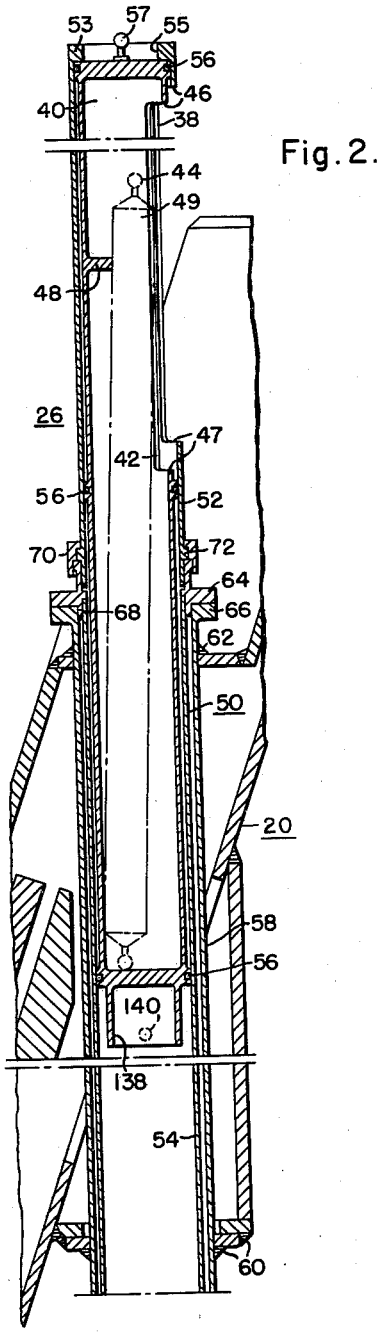
FIG. 2 is a sectional view of the upward end of the transfer mechanism.

The fuel element 32 then can be lowered through an elongated slot 38 disposed adjacent the upward end of the transfer mechanism 26 and shown more clearly in FIG. 2 of the drawings. A tubular carrier 40 is held adjacent the slot 38, by means presently to be described, and is adapted to receive the fuel element 32 through a similarly shaped slot 42 provided in the carrier at a position coincident with the slot 38. The inclination of the transfer mechanism 26 is such as to afford easy entrance of and access to the fuel element 32 as it is inserted through the coincident slots 38 and 42. In order that a fuel element handling tool can be lowered vertically from the upper opening of the reactor vessel 20 to engage knob 44 of the element 32, the transfer mechanism 26 is inclined at such an angle to the reactor vessel 20 that the tool can be inserted through the upwardly disposed openings or slots 38 and 42 in a position such that it will clear the upper and lower extremities 46 and 47 of each slot 38 or 42. In furtherance of this purpose, a rib 48 secured to the inner wall of the carrier 40 is furnished in order to support the upward end 49 of the fuel element 32 in a position immediately adjacent the outer opening 38.

The tubular carrier 40 is slidably mounted within a conduit member 50 including a relatively short external upper section 52 and an elongated lower internal section 54. The upward end of external conduit section 52 is provided with an inwardly extending stop 53 for limiting the upward travel of the carrier 40. An aperture 55 is desirably provided in the upward end of the external conduit section 52 through which a suitable tool can be inserted, if desired, for grasping knob 57 of the carrier 40, in order to mechanically support the carrier 40 in the uppermost position thereof. The carrier 40 is sealed at a plurality of points along the length thereof, to the conduit member 50, with which the carrier conforms, by means of O-rings 56 spaced along the length thereof. The O-rings 56 are provided in order to ensure continuous sealing between the carrier 40 and the conduit member 50 as the carrier moves relative to the various joints in the transfer mechanism. Although two such O-rings disposed at ends of the carrier 40 are sufficient to form an effective seal as the carrier passes through the conduit member 50, in this application three O-rings 56 are utilized to minimize leakage from the reactor vessel 20, via the transfer mechanism 26 into the canal 30.

The conduit member 50 by having the elongated internal section 54 thereof inserted within a shroud tube 58, which is imbedded in the concrete shielding 24, is thus arranged for easy removal of the conduit member 50 without disturbing the shielding 24 or hermetic welding seals 60 and 62 whereby the shroud tube 58 is sealed to the reactor vessel 20. In order that the entire reactor core 22 can be removed from the reactor vessel 20, should the occasion arise, the external upper conduit section 52, which protrudes from the shroud tube 58 into the interior of the reactor vessel 20, can be removed from the elongated internal section 54 to permit passage of the core 22. In furtherance of this purpose a coupling member 64 is threaded to the upward end of the elongated internal section 54 and is bolted to a flange 66 secured to the upward end of the shroud tube 58. The coupling member 64 is thus adapted to threadedly receive and position the upward end of the elongated inner conduit section 54 relative to the shroud tube 58 by thus inserting a threaded section 68 therebetween. The other end of the coupling member 64 is likewise threaded to receive a flanged nut 70 inserted over the external upper conduit section 52 and cooperating with a shoulder 72 formed on the external upper section in order to removably couple the external upper conduit section 52 to the elongated inner conduit section 54.

Figure 3:
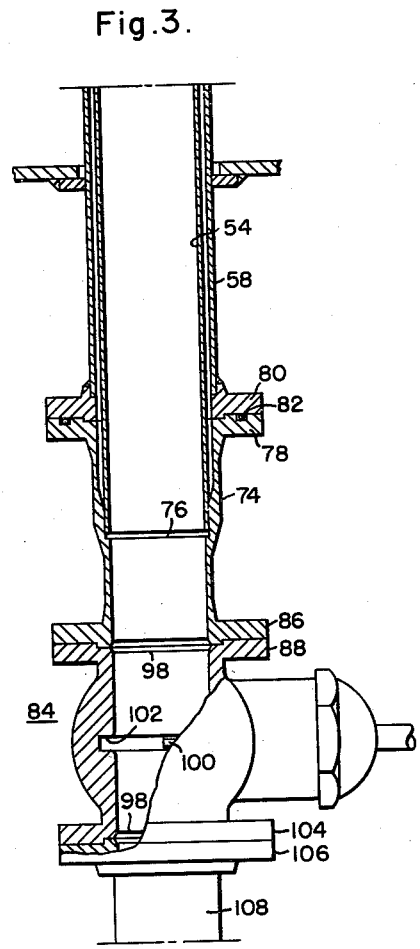
FIG. 3 is a view partly in section of a central portion of the transfer mechanism.

The lower end of the inner conduit section 54, as better shown in FIG. 3, is spaced from the surrounding shroud tube 58 by interfitting the end of the conduit section within a flanged pipe coupling 74, where it is held against a machined shoulder 76 by operation of gravity. An upper flange 78 of the pipe coupling 74 is removably secured, in any convenient manner, to a complementary flange 80 formed at the downward end of the shroud tube 58. Suitable sealing means 82, such as an O-ring, is provided between the upper flange 78 and the complementary flange 80. It will be apparent that the entire conduit member 50 can be easily removed, when desired, from the shroud tube 58 simply by unsecuring the flanges 64, 66 and 78, 80 and withdrawing through the top of the reactor vessel 20, the entire conduit member 50, including the external upper conduit section 52, the internal lower conduit section 54, and the aforedescribed coupling means therefor.

At the lower end of the flange pipe coupling 74 a gate valve 84 is secured thereto by means of respective flanges 86 and 88 secured together by suitable fastening means. The gate valve 84 is disposed within an alcove 92 (FIG. 1) formed within the concrete shielding 24 and lead shielding 25 and is operable from without the shielding by means of a handwheel and drive shaft assembly 94 connected to suitable well-known valve linkage indicated generally by the reference character 96. Openings 98 at either end of the gate valve 84 are shaped to conform to the inner periphery of the conduit member 50 and, therefore, are sufficiently large to permit passage of the tubular carrier 40 when the gate valve 84 is manipulated to its fully open position. When the transfer mechanism 26 is being utilized during reactor shutdown, the gate valve 84 is left open, since the sealing means associated with the carrier 40 and comprising the O-rings 56 are sufficient to prevent leakage from the reactor vessel 20 upon opening and relieving the pressure therein. After use of the transfer mechanism 26 has been terminated and before the reactor is started up, valve gate 100 is actuated to its closed position against a valve seat 102 to prevent any possible leakage, via the transfer mechanism 26 where the reactor vessel 20 is pressurized. In order to provide passage for the tubular carrier 40 from the interior of the reactor vessel 20 through the transfer mechanism 26 for loading or unloading in the canal 30 (FIG. 1), in a manner presently to be described, the lower end of the valve 84 is coupled by means of flanges 104 and 106, respectively, to a canal tube 108. Since the canal tube 108 is not imbedded in any biological shielding surrounding the vessel 20, it is not necessary to uttlize a shroud tube to encase the canal tube 108.

Figure 4:
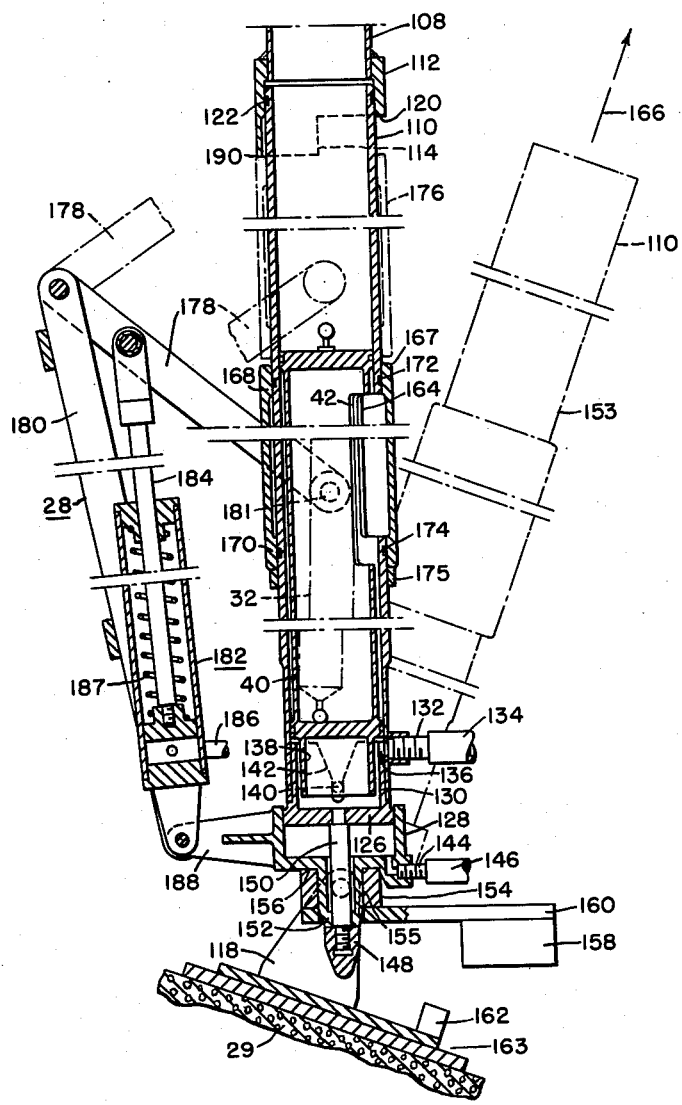
FIG. 4 is a sectional view of the downward end of the transfer mechanism.

The canal tube 108 extends downwardly through the water or other appropriate liquid contained within the canal 30 and is joined, as better shown in FIG. 4, to an appropriate loading and unloading mechanism including, for an example a detachable tubular section 110 and associated operating mechanism (presently to be described) secured to the bottom wall 29 of the canal 30 (FIG. 1). The canal tube 108 is welded or otherwise secured and sealed adjacent the lower end thereof to a collar 112. The lower end of the collar 112 is stepped such that a stepped portion or arcuate stop 114 is formed thereon.

The stop 114 is adapted to receive and engage the upper end of the detachable tubular section 110, which is hingedly mounted to a bearing bracket 118 secured to the bottom wall 29 of the canal 30. Means are associated with the mounting of the tubular section 110, for lowering the tubular section 110 a sufficient distance to clear cut-away portion 120 of the collar 112. Thus, upon lowering the tubular section 110, the same can be pivoted out of alignment with the canal tube 108 in order that the tubular section 110 and the associated operating mechanism can be separated from the bearing bracket 118 and the canal tube 108 for removal from the canal 30.

The upward end of the tubular section 110 is provided with an O-ring 122 or other suitable sealing means in order that the tubular section, when in the operating position shown in FIG. 4, can be sealed to the collar 112 and hence to the bottom end of the canal tube 108. When the tubular section is thus positioned, the carrier 40 after passing through the gate valve 84 (FIG. 3) can likewise pass through the joint thus formed between the tubular section 110 and the canal tube 108.

The lower end of the tubular section 110 is secured, as by welding, to a piston 126 mounted for movement within an open-ended cylinder 128. To aid in securing the piston 126 to tubular section 110, the former is provided with an annular extension or sleeve 130 inserted snugly into the lower end of the tubular section 110. Adjacent the lower end of the tubular section there is coupled a conduit 132 connected by means of flexible tubing 134 to a suitable high pressure fluid system (not shown). The annular extension 130 of the piston 126 is furnished with an aperture 136 through which the conduit 132 communicates with the space enclosed by the piston 126 and the tubular section 110. Through the conduit 132 pressurized water or other fluid can be admitted from a convenient source in order to force the tubular carrier 40 upwardly through the transfer mechanism 26 to convey fuel elements 32 to and from the reactor vessel 20.

It has been noted heretofore that it is necessary that the loading and unloading slots or apertures of the transfer mechanism and carrier be coincident for the proper use of the mechanism. In furtherance of this purpose, the lower end of the carrier 40 in an example of the invention is provided with a downwardly extending annular projection 138 which loosely interfits the piston extension 130. An aligning pin 140 is secured to the exterior of the annular carrier projection 138 and is adapted to cooperate with a V-shaped slot 142 formed in the wall of the annular piston extension 130. In this manner any slight turning or radial misalignment of the carrier 40 relative to the conduit member 50, and consequent misalignment of the aforesaid loading and unloading slots, imparted to the tubular carrier 40 as it moves along the length of the transfer mechanism 26 is corrected, upon each descent of the tubular member 40 by engagement of the pin 140 with the walls of the slot 142 of the piston projection 130. It will be appreciated that a similar aligning arrangement can be associated with the upward end of the transfer mechanism, where desired.

To raise and lower the tubular section 110 and its associated mechanism, water or other fluid is admitted under pressure into the interior of the open-ended cylinder 128 via the inlet conduit 144 coupled through suitable flexible tubing 146 to a pressurized fluid system (not shown). During operation of the transfer mechanism 26, the tubular section 110 is urged normally upwardly against the bottom end of the canal tube 108 by the hydraulic pressure existing within the cylinder 128 and acting upon the piston 126. The upper movement of the piston 126 is limited by a nut 148 threaded onto the lower end of piston rod 150. The nut 148 engages the lower end of tubular projection 152 provided on the cylinder 128 and thereby forming a stop which limits the upward movement of the piston 126. Upon release of the hydraulic pressure existing within the cylinder 128, the tubular section 110 and piston 126 drop sufficiently to permit the upward end of the tubular section 110 to clear the stepped portion 120 of the collar 112. The tubular section 110 and the associated operating mechanism can then be moved sidewise through a vertical arc to the position shown in dashed outline and indicated generally by reference character 153 in FIG. 4, for removal of the tubular section 110 and its associated mechanism. Removal of the same is facilitated by provision of a cradle 154 hingedly mounted to the bearing bracket 118 and furnished with a circular receptacle 155 into which the tubular projection 152 of the cylinder 128 is inserted. Thus the weight of the tubular section 110 and its associated mechanism is supported by the engagement of cylinder 128 with surface 156 of the cradle 154. Since the tubular section 110 and associated mechanism is held within the cradle 154 by the weight thereof, the tubular section 110 can be lifted out of the cradle 154 after the former is moved to its vertical position 153. Upon removal of the tubular section 110 and the associated cylinder 128, the cradle 154 is maintained in the vertical position thereof, for easy insertion of the tubular projection 152 of the cylinder 128 into the cradle receptacle 155, by means of a weight 158 secured to lever arm 160. A suitable stop 162 is secured to bearing bracket base 163 for limiting the arcuate movement of the arm 160 and thereby to determine the vertical position of the cradle 154. The bottom end of the tubular projection 152 and nut 148 are chamfered to facilitate insertion thereof in the cradle receptacle 155.

The tubular carrier 40 is unloaded at the lowermost position thereof by means of an elongated opening or slot 164 disposed adjacent the lower end of the detachable tubular section 110 and arranged to coincide with the slot 42 of the carrier 40 in the lowermost position thereof. As indicated by vertical line 166 of FIG. 4, the inclination of the transfer mechanism is sufficient to facilitate unloading of a fuel element 32 through the coincident slots 164 and 42. Thus, the fuel element 32 can be removed from or inserted into the tubular carrier 40 by a suitable long handled tool or remote handling mechanism operated from the top of the canal 30, in a manner described heretofore in connection with the elongated slot or aperture 38 disposed adjacent the upward end of the transfer mechanism 26. It will be appreciated that adequate biological shielding for personnel operating the transfer mechanism 26 is afforded by the water in the canal which is of sufficient depth to provide adequate biological shielding from the fuel element 32 in the uppermost position thereof required for removal from the tubular section 110 for personnel operating the transfer mechanism.

In order to prevent the emission of reactor coolant from the transfer mechanism 26 when the valve 84 is opened, remotely operated means are provided for closing and sealing the lower aperature 164 of the transfer mechanism, when the tubular carrier 40 is being passed through the valve 84. As shown in FIG. 4, one form of such closing means includes a valve sleeve 167 furnished with upper and lower inwardly extending ribs 168 and 170. The ribs 168 and 170 of the valve sleeve 167 are arranged to engage O-rings 172 and 174 mounted on the tubular section 110 and disposed adjacent the upper and lower limits respectively of the elongated loading aperture 164. Thus, when the valve sleeve 167 is in the position shown in FIG. 4, the engagement of the ribs 168 and 170 thereof with the O-rings 172 and 174 respectively prevents the leakage of fluid from the transfer mechanism 26. A suitable stop-collar 175 is secured to the tubular section 110 to limit the downward travel of valve sleeve 167 and to position the ribs 168 and 170 relative to the O-rings 172 and 174.

In order to load or unload the carrier 40, the valve sleeve 167 is moved upwardly to the position shown in dashed outline 176 of FIG. 4. One arrangement for moving the valve sleeve 167 relative to the tubular extension 110 includes a pair of hingedly connected upper and lower arms 178 and 180, respectively, and a suitable piston and cylinder arrangement indicated generally at 182. The upper arm 178 is pivotally connected to the valve sleeve 167 as indicated by reference character 181. A piston rod 184 is coupled to the upper arm 178 at a point spacedly removed from the hinged coupling of the arms 178 and 180 and thus is arranged to move the arm 178 and the valve sleeve 167 upwardly when a pressurized fluid is admitted to the piston and cylinder arrangement 182 via inlet conduit 186. A suitable spring 187 is provided within the piston and cylinder arrangement 182 to urge the piston thereof downwardly in order to ensure return of the valve sleeve 167 to its sealing position upon release of the fluid pressure existing within the piston and cylinder arrangement 182. The piston and cylinder arrangement and the lower end of the arm 180 are pivotally mounted adjacent the end of a bracket 188 secured to the outer wall of the open ended cylinder 128. When the valve sleeve 167 is actuated to its upper position to permit loading or unloading of the tubular carrier 40, the lower end 190 of the collar 112 affords a stop to limit the upward movement of the valve sleeve 167. It is contemplated that the aperture 38 of the upper conduit section 52 can be closed, if desired, by a similar valve sleeve (not shown) slidably mounted on the conduit 52 adjacent the upper loading and unloading slot 38. Similar remotely operated means can be provided within the vessel 20 for actuating the valve sleeve to close the slot 38. With this arrangement valve 84 can be eliminated in those applications wherein pressures within the vessel 20 are not severely high.

From the foregoing it is apparent that a novel and efficient transfer mechanism has been disclosed. Although the transfer mechanism has been described in connection with applications thereof associated with a nuclear reactor, it will be apparent that the use of the transfer mechanism forming the subject of this invention is not limited to such applications, but is of general use in applications requiring transfer of objects between a station above and one below a water or other liquid level. Therefore, numerous changes in the transfer mechanism will occur to those skilled in the art without departing from the scope of the appended claims. Moreover, it is to be understood that certain features of the invention can be utilized without a corresponding use of other features.

I claim as my invention:

1. In a transfer mechanism the combination comprising a tubular conduit having a loading and unloading aperture adjacent each end thereof; a tubular carrier mounted within said conduit for movement along the length of said conduit, said carrier having an aperture disposed therein to coincide with said conduit apertures respectively at the limits of said movement; at least one valve sleeve mounted on said conduit, said sleeve being disposed adjacent one of said conduit apertures; means for moving said valve sleeve to a position of closing relationship with said one conduit aperture; means for moving said carrier through said conduit; and means associated with an end of said conduit for radially aligning said carrier relative to said conduit.

2. In a transfer mechanism the combination comprising a tubular conduit having a loading and unloading aperture adjacent each end thereof; a tubular carrier mounted within said conduit for movement along the length of said conduit, said carrier having an aperture disposed therein to coincide with said conduit apertures respectively at the limits of said movement; at least one valve sleeve mounted on said conduit, said sleeve being disposed adjacent one of said conduit apertures; means for moving said valve sleeve to a position of closing relationship with said one conduit aperture; means for moving said carrier through said conduit; and means associated with an end of said conduit for radially aligning said carrier relative to said conduit, said last-mentioned means including an annular sleeve inserted within and disposed adjacent to an end of said conduit, an annular projection secured to an end of said carrier, said projection being arranged to loosely interfit said sleeve, said sleeve having a V-shaped slot formed in a wall thereof, and an aligning pin secured to said annular projection and arranged to be inserted in said slot.

3. In an atomic reactor including a hermetically sealed vessel, a reactor core supported within said vessel, a number of elongated fuel elements supported within said reactor core and shielding material surrounding said vessel; the combination comprising a shroud tube hermetically sealed to said vessel and communicating therewith, said tube passing through said shielding material; a tubular conduit inserted through said shroud tube, said conduit having a loading and unloading aperture communicating with the interior of said vessel and a second loading and unloading aperture disposed in said conduit without said vessel; valve means coupled in said conduit and disposed between said apertures; a tubular carrier mounted within said conduit for movement therethrough and through said valve, said carrier having a loading and unloading aperture disposed therein to coincide with said conduit apertures respectively at the extremities of said movement; a valve sleeve mounted on said conduit and adjacent said second aperture; means for moving said valve sleeve to a position of closing relationship relative to said second conduit aperture; and means for moving said carrier through said conduit.

4. In an atomic reactor including a hermetically sealed vessel, a reactor core supported within said vessel, a number of elongated fuel elements supported within said reactor core, shielding material surrounding said vessel and a canal passing beneath said reactor vessel; the combination comprising a shroud tube hermetically sealed to said vessel and passing through said shielding; a tubular conduit inserted through said shroud tube and secured to the bottom of said canal, said conduit having a first loading and unloading aperture communicating with said reactor vessel and a second loading and unloading aperture disposed adjacent the bottom of said canal; valve means coupled in said conduit and between said first and second apertures; means for operating said valve from a position without said shielding; a tubular carrier mounted within said conduit for movement therethrough and through said valve means; means for moving said carrier through said conduit; a valve sleeve mounted on said conduit at a position adjacent said second aperture; sealing means disposed adjacent said second aperture; means associated with said valve sleeve for engaging said sealing means; and means for moving said valve sleeve to a position of engagement thereof with said sealing means and of closing relationship thereof relative to said second aperture.

5. In a transfer mechanism the combination comprising a tubular conduit having a loading and unloading aperture adjacent each end thereof; a tubular carrier mounted within said conduit for movement along the length of said conduit; said carrier having an aperture disposed therein to coincide wtih said conduit apertures respectively at the limits of said movement; at least one valve sleeve mounted on said conduit, said sleeve being disposed adjacent one of said conduit apertures; means for moving said valve sleeve to a position of closing relationship with said one conduit aperture; means for moving said carrier through said conduit; and valve means coupled in said conduit at a position between said conduit apertures, said valve means being arranged to admit said carrier at an open position of said valve.

6. In a transfer mechanism the combination comprising a tubular conduit having a loading and unloading aperture adjacent each end thereof; an elongated tubular carrier mounted within said conduit for movement along the length of said conduit, said carrier having an aperture disposed therein to coincide with said conduit apertures respectively at the limits of said movement; a plurality of sealing means disposed along the length of said tubular carrier and engaging the inner periphery of said conduit; at least one valve sleeve mounted on said conduit adjacent said conduit apertures; means for moving said valve sleeve to a position of closing relationship with said conduit apertures; and means for moving said carrier through said conduit.

7. In a transfer mechanism the combination comprising a tubular conduit having a loading and unloading aperture adjacent each end thereof, said conduit having a detachable section thereof engaged adjacent an end of said conduit; a tubular carrier mounted within said conduit for movement along the length of said conduit, said carrier having an aperture disposed therein to coincide with said conduit apertures respectively at the limits of said movement; at least one valve sleeve mounted on said conduit, said sleeve being disposed adjacent one of said conduit apertures; means for moving said valve sleeve to a position of closing relationship with said one conduit aperture; means for moving said carrier through said conduit; means for moving said detachable section axially of said conduit; and means for tilting said detachable section to a position out of axial alignment with said conduit.

8. In a transfer mechanism the combination comprising a tubular conduit having a loading and unloading aperture adjacent each end thereof, said conduit having a detachable section thereof engaged adjacent an end of said conduit; a tubular carrier mounted within said conduit for movement along the length of said conduit, said carrier having an aperture disposed therein to coincide with said conduit apertures respectively at the limits of said movement; at least one valve sleeve mounted on said conduit, said sleeve being disposed adjacent one of said conduit apertures; means for moving said valve sleeve to a position of closing relationship with said one conduit aperture; means for moving said carrier through said conduit; means for moving said detachable section axially of said conduit, said last-mentioned means including an open-ended cylinder, a piston secured to said detachable conduit section and inserted in said cylinder, and a conduit connecting said cylinder to a source of pressurized fluid; means maintaining the alignment of said detachable conduit section relative to said conduit throughout the stroke of said piston; and means for moving said detachable conduit section out of axial alignment with said conduit at an end of said piston stroke.

9. In a transfer mechanism the combination comprising a tubular conduit having a loading and unloading aperture adjacent each end thereof, said conduit having a detachable section thereof engaged adjacent an end of said conduit; a tubular carrier mounted within said conduit for movement along the length of said conduit, said carrier having an aperture disposed therein to coincide with said conduit apertures respectively at the limits of sadi movement; at least one valve sleeve mounted on said conduit, said sleeve being disposed adjacent one of said conduit apertures; means for moving said valve sleeve to a position of closing relationship with said one conduit aperture; means for moving said carrier through said conduit; means for moving said detachable section axially of said conduit; said last-mentioned means including an open-ended cylinder, a piston secured to said detachable conduit section and inserted in said cylinder, and a conduit connecting said cylinder to a source of pressurized fluid; and means for maintaining the alignment of said detachable conduit section relative to said conduit throughout the stroke of said piston and for moving said detachable conduit section out of axial alignment with said conduit at an end of said piston stroke, said last-mentioned means including a collar secured to an end of said conduit and having a cut-away portion and a stepped portion normally engaging an end of said detachable section during said piston stroke, and a weighted arm rigidly secured to said cylinder, said weighted arm being arranged to move said cylinder and said detachable conduit section at an end of said piston stroke to a position thereof out of axial alignment with said conduit, said detachable section end being passed through said collar cut-away portion.

10. In an atomic reactor including a hermetically sealed vessel, a reactor core supported within said vessel, a number of elongated fuel elements supported within said reactor core and shielding material surrounding said vessel; the combination comprising a shroud tube hermetically sealed to said vessel and communicating therewith, said tube passing through said shielding material; a tubular conduit inserted through said shroud tube, said conduit having a loading and unloading aperture communicating with the interior of said vessel and a second loading and unloading aperture disposed in said conduit without said vessel; a tubular carrier mounted within said conduit for movementment therethrough, said carrier having a loading and unloading aperture disposed therein to coincide with said conduit apertures respectively at the extremities of said movement; at least one valve sleeve mounted on said conduit, said sleeve being disposed adjacent one of said conduit apertures; means for moving said valve sleeve to a position of closing relationship with said one conduit aperture; and means for moving said carrier through said conduit.

11. In a transfer mechanism the combination comprising a tubular conduit having a loading and unloading aperature adjacent each end thereof, said conduit having a detachable section thereof engaged adjacent the lower end of said conduit; a tubular carrier mounted within said conduit for movement along the length of said conduit, said carrier having an aperture disposed therein to coincide with said conduit apertures respectively at the limits of said movement; at least one valve sleeve mounted on said conduit, said sleeve being disposed adjacent one of said conduit apertures; means for moving said valve sleeve to a position of closing relationship with said one conduit aperture; means for moving said carrier through said conduit; means for moving said detachable section axially of said conduit; and means for moving said detachable section out of axial alignment with said conduit.

12. In an atomic reactor including a hermetically sealed vessel, a reactor core supported within said vessel, a number of elongated fuel elements supported within said reactor core and shielding material surrounding said vessel, the combination comprising a shroud tube hermetically sealed to said vessel and communicating therewith, said tube passing through said shielding material, a tubular conduit inserted through said shroud tube, said conduit having a loading and unloading aperture communicating with the interior of said vessel, and a second loading and unloading aperture disposed in said conduit without said vessel, valve means coupled in said conduit and disposed between said apertures, a tubular carrier mounted within said conduit for movement therethrough and through said valve, said carrier having a loading and unloading aperture disposed therein to coincide with said conduit apertures respectively at the extremities of said movement, aperture closing and sealing means mounted adjacent said second conduit aperture for closing and sealing said second aperture, and means for moving said carrier through said conduit.

13. In a transfer mechanism the combination comprising a tubular conduit having a loading and unloading aperture adjacent each end thereof, a tubular carrier mounted within said conduit for movement along the length of said conduit, said carrier having an aperture disposed therein to coincide with said conduit apertures at the limits of said movement, aperture closing and sealing means mounted adjacent at least one of said conduit apertures for closing and sealing said one aperture, valve means coupled in said conduit at a position between said conduit apertures, said valve means being shaped to admit said carrier at an open position of said valve means, and means for moving said carrier through said conduit.

14. In a transfer mechanism the combination comprising a tubular conduit having a loading and unloading aperture adjacent each end thereof, a tubular carrier mounted within said conduit for movement along the length thereof, said carrier having an aperture disposed therein to coincide with said conduit apertures respectively at the limits of said movement, at least one valve sleeve mounted on said conduit, said sleeve being disposable adjacent an associated one of said conduit apertures, means for moving said valve sleeve to a position of closing relationship with its associated conduit aperture, and means for moving said carrier through said conduit.

15. In an atomic reactor including a sealed vessel, a reactor core supported within said vessel, a number of elongated fuel elements supported within said reactor core, and shielding material surrounding said vessel; the combination comprising a fuel transfer conduit means sealed to said vessel and communicating therewith, said conduit means passing through said shielding material and having a loading and unloading aperture adjacent one end thereof, a tubular carrier mounted within said conduit means for movement therethrough, said carrier having a loading and unloading aperture disposed therein to coincide with said conduit means aperture at a position of said carrier adjacent said conduit means end, a valve member mounted on said conduit means and disposable adjacent said conduit means aperture, said valve member being shaped to close said aperture, means for moving said valve member to positions of opening and closing relation with said conduit means aperture, means for moving said carrier through said conduit, and means for loading and unloading said carrier at a position thereof adjacent the other end of said conduit means.

16. In a transfer mechanism the combination comprising an elongated tubular conduit having a loading and unloading aperture adjacent an end thereof, a tubular carrier mounted within said conduit for movement along the length thereof, said carrier having an aperture disposed therein to coincide with said conduit aperture at a position of said carrier adjacent said conduit end, a valve sleeve circumferentially surrounding a portion of said conduit, said sleeve being disposable adjacent said conduit aperture, means for moving said valve sleeve to a position of closing relationship with said conduit aperture, means for moving said carrier through said conduit, and means for loading and unloading said carrier at a position thereof adjacent the other end of said conduit.

17. In a transfer mechanism the combination comprising an elongated tubular conduit having a loading and unloading aperture adjacent an end thereof, a tubular carrier mounted within said conduit for movement along the length thereof, said carrier having an aperture disposed therein to coincide with said conduit aperture at a position of said carrier adjacent said conduit end, aperture closing and sealing said one aperture means mounted adjacent said conduit aperture and movable relative to said conduit aperture for opening and closing said conduit aperture when the closure aperture is coincident therewith, valve means coupled in said conduit at a position between said conduit aperture and the other end of said conduit, said valve means being shaped so that said carrier can pass completely therethrough at an open position of said valve means, means for moving said carrier through said conduit, and means for loading and unloading said carrier at a position thereof adjacent said other end of said conduit.

References Cited in the file of this patent

UNITED STATES PATENTS

| | | |
|---|---|---|
| 780,680 | Peterson et al. | Jan. 24, 1905 |
| 1,999,624 | Biazzi et al. | Apr. 30, 1935 |